(12) United States Patent
Inui et al.

(10) Patent No.: US 6,504,342 B2
(45) Date of Patent: Jan. 7, 2003

(54) BATTERY PACK

(75) Inventors: Kiwamu Inui, Toyohashi (JP); Toshiaki Nakanishi, Toyohashi (JP)

(73) Assignees: Matsushita Electric Industrial Co., Ltd., Osaka (JP); Toyota Jidosha Kabushiki Kaisha, Aichi (JP)

(*) Notice: Subject to any disclaimer, the term of this patent is extended or adjusted under 35 U.S.C. 154(b) by 0 days.

(21) Appl. No.: 09/954,921

(22) Filed: Sep. 13, 2001

(65) Prior Publication Data

US 2002/0030468 A1 Mar. 14, 2002

(30) Foreign Application Priority Data

Sep. 13, 2000 (JP) .......................................... 2000-278948

(51) Int. Cl.[7] .................................................. H02J 7/00
(52) U.S. Cl. ........................................ 320/112; 320/107
(58) Field of Search ................................. 320/112, 107, 320/116, 117; 429/163, 176, 112, 99

(56) References Cited

U.S. PATENT DOCUMENTS

| | | | | |
|---|---|---|---|---|
| 5,322,745 A | * | 6/1994 | Yanagihara et al. | ........... 429/59 |
| 5,916,515 A | * | 6/1999 | Bryan et al. | ............... 29/623.3 |
| 6,111,387 A | * | 8/2000 | Kouzu et al. | ............... 320/107 |
| 6,270,920 B1 | * | 8/2001 | Nakanishi et al. | .......... 429/163 |
| 6,335,116 B1 | * | 1/2002 | Yamane et al. | ............. 429/176 |

* cited by examiner

*Primary Examiner*—Edward H. Tso
*Assistant Examiner*—Lawrence Luk
(74) *Attorney, Agent, or Firm*—Snell & Wilmer, LLP

(57) ABSTRACT

A battery pack comprises at least one pair of battery modules, each of the battery modules including a plurality of battery cells connected in series, in which the at least one pair of the battery modules are connected in parallel and are positioned in close vicinity to each other such that radiant heat can be transferred between the battery modules.

4 Claims, 4 Drawing Sheets

BATTERY PACK

BACKGROUND OF THE INVENTION

1. Field of the Invention

The present invention relates to a battery pack suitably used in an electric vehicle, such as hybrid electric vehicle (HEV), pure electric vehicle (PEV), or the like, which uses an electric motor as at least a part of its power source. Specifically, the present invention relates to a battery pack in which a pair of battery modules connected to each other in parallel, with each battery module including a plurality of battery cells connected in series.

2. Description of the Related Art

An electric vehicle, such as HEV, PEV, or the like, uses a high-voltage battery for powering its electric motor. Usually, in order to gain a high voltage, such a high-voltage battery includes a plurality of battery modules connected in series or in parallel, and each of the battery modules includes a plurality of battery cells connected in series.

Generally, in designing such a battery pack, a positional arrangement of the battery modules is determined such that high-voltage wires for connecting the battery modules may be efficiently arranged.

A battery pack including battery modules connected in parallel has a characteristic of the size of a charging current flowing into each battery module depending only on a voltage of the battery modules. The voltage of each battery module depends on charging conditions, temperature, etc., of each battery cell.

The problems caused by such a characteristic are described with reference to FIGS. 5–7B.

FIG. 5 shows an equivalent circuit of a battery pack including battery modules connected in parallel. Referring to FIG. 5, a charging current I flowing through the entire battery pack is divided such that the voltages $V_1$–$V_n$ of battery modules $2_1$–$2_n$ have the same value, and the divided currents flow through the battery modules $2_1$–$2_n$ as battery currents $I_1$–$I_n$. Electromotive forces $E_1$–$E_n$ and internal resistances $R_1$–$R_n$ of the battery modules $2_1$–$2_n$ depend on conditions of battery cells in the battery modules $2_1$–$2_n$, such as temperature, state of charge (hereinafter, referred to as SOC), etc. As shown in FIG. 6, in general, when charging an NiMH (nickel metal hydride) battery, the voltage of the battery gradually increases until the SOC reaches a full-charge region, but after the SOC has reached the full-charge region, the battery voltage gradually decreases.

In such a NiMH battery including battery modules connected in parallel, in the case where the amount of charged electric power is different among the battery modules when the SOC of one of the battery modules reaches the full-charge region, the battery voltage of the battery module decreases, and accordingly, a charging current flows into the battery module. For example, in FIG. 7A, a pair of battery modules $2_1$ and $2_2$ connected in parallel are shown. When the battery module $2_1$ is fully charged and the battery voltage $V_1$ decreases, a charging current flows into the battery module $2_1$ so that the battery voltage $V_1$ has the same value as a battery voltage $V_2$ of the other battery module $2_2$. In FIG. 7B, a case where there is no charging current flowing from outside is shown. Even in this case, when the battery module $2_1$ is fully charged, a current flows from the other battery module $2_2$ which is not fully charged into the battery module $2_1$. As a result, the battery module $2_1$ is overcharged. When the overcharging of the battery module continues, battery cells in the battery module deteriorate. Such a problem may occur due to variation in the amount of electric power charged in battery cells.

SUMMARY OF THE INVENTION

According to one aspect of this invention, there is provided a battery pack including at least one pair of battery modules, each of the battery modules including a plurality of battery cells connected in series, wherein the at least one pair of the battery modules are connected in parallel and are positioned in close vicinity to each other such that radiant heat can be transferred between the pair battery modules.

According to another aspect of this invention, there is provided a battery pack including at least one pair of battery modules, each of the battery modules including a plurality of battery cells connected in series, wherein the at least one pair of the battery modules are connected in parallel and are coupled to each other by a heat transfer member.

According to still another aspect of this invention, there is provided a battery pack including at least one pair of battery modules, each of the battery modules including a plurality of battery cells connected in series, wherein the at least one pair of the battery modules are connected in parallel and are positioned in a region of a case which has a uniform cooling condition.

According to still another aspect of this invention, there is provided a battery pack including at least one pair of battery modules located in a case, each of the battery modules including a plurality of battery cells connected in series, wherein the at least one pair of the battery modules are connected in parallel and are positioned so as to obtain the same cooling condition from a cooling medium flowing through the case.

Thus, the invention described herein makes possible the advantages of providing a battery pack including battery modules connected in parallel, wherein differences in the state of charge between the battery modules is reduced by increasing differences in temperatures between battery modules.

These and other advantages of the present invention will become apparent to those skilled in the art upon reading and understanding the following detailed description with reference to the accompanying figures.

DESCRIPTION OF THE PREFERRED EMBODIMENTS

EMBODIMENT 1

Hereinafter, Embodiment 1 of the present invention is described with reference to FIG. 1.

Figure 1:
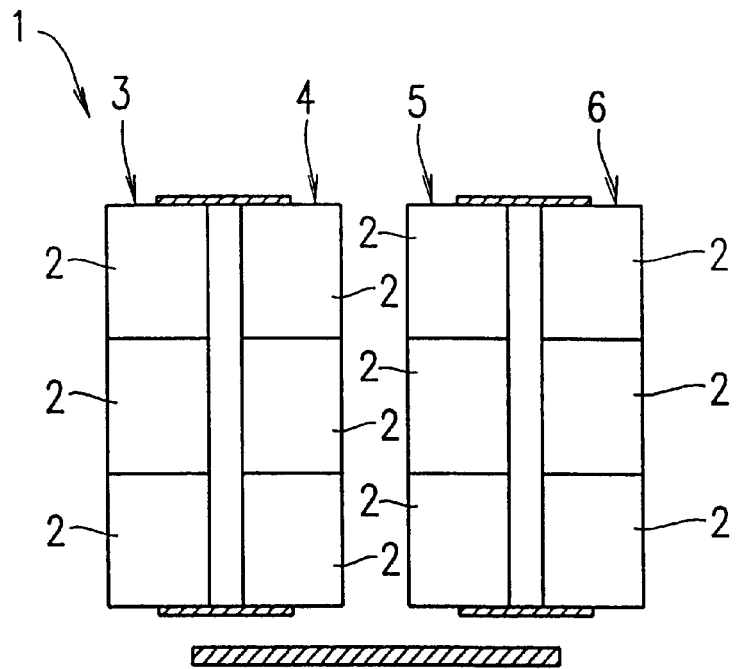
FIG. 1 schematically shows a structure of a substantial part of a battery pack according to Embodiment 1 of the present invention.

FIG. 1 schematically shows a structure of a substantial part of a battery pack 1 according to Embodiment 1 of the present invention. The battery pack 1 includes a pair of battery modules 3 and 4 and a pair of battery modules 5 and 6, each battery module including a plurality of battery cells 2 connected in series. The pair of the battery modules 3 and 4 are connected to each other in parallel. The other pair of the battery modules 5 and 6 are also connected to each other in parallel.

The pair of battery modules 3 and 4 are positioned in close vicinity to each other. The other pair of the battery modules 5 and 6 are also positioned in close vicinity to each other.

The pair of battery modules 3 and 4 connected in parallel are positioned in close vicinity to each other because as the distance between the battery modules 3 and 4 decreases, radiant heat is more easily transferred between the battery modules 3 and 4. As a result, the difference in the temperature between the battery modules 3 and 4 is decreased.

By decreasing the difference in the temperature between the battery modules 3 and 4, the variation in the amount of electric power charged in the battery cells 2 of the battery modules 3 and 4 can be suppressed. Thus, the deterioration of each battery cell 2 can be suppressed.

Similarly, since the pair of the battery modules 5 and 6 are positioned in close vicinity to each other, radiant heat can be easily transferred between the battery modules 5 and 6. Accordingly, the difference in the temperature between the battery modules 5 and 6 is decreased. As a result, the variation in the amount of electric power charged in the battery cells 2 of the battery modules 5 and 6 can be suppressed, and the state of charge the battery cells 2 can become uniform. As a result, deterioration of the battery cells 2 can be suppressed.

EMBODIMENT 2

Figure 2:
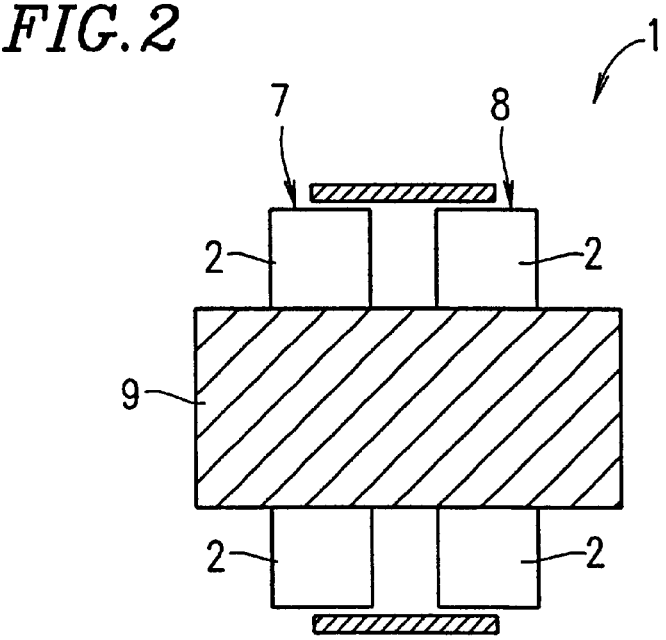
FIG. 2 schematically shows a structure of a substantial part of a battery pack according to Embodiment 2 of the present invention.

FIG. 2 schematically shows a structure of a substantial part of a battery pack 1 according to Embodiment 2 of the present invention. The battery pack 1 includes a pair of battery modules 7 and 8, each of the battery modules 7 and 8 including a plurality of battery cells 2 connected in series. The battery modules 7 and 8 are connected to each other in parallel.

In a central part of the battery modules 7 and 8, a high heat conductive member 9 is provided so as to bridge over the battery modules 7 and 8. The high heat conductive member 9 is formed of an aluminum plate, or the like.

With the high heat conductive member 9 provided over the battery modules 7 and 8, heat is conducted well between the battery modules 7 and 8. In such a structure, the difference in the temperature between the battery modules 7 and 8 is decreased. Therefore, the variation in the amount of electric power charged in the battery cells 2 of the battery modules 7 and 8 can be suppressed, and the state of charge of the battery cells 2 can become uniform. As a result, deterioration of the battery cells 2 can be suppressed.

EMBODIMENT 3

Figure 3:
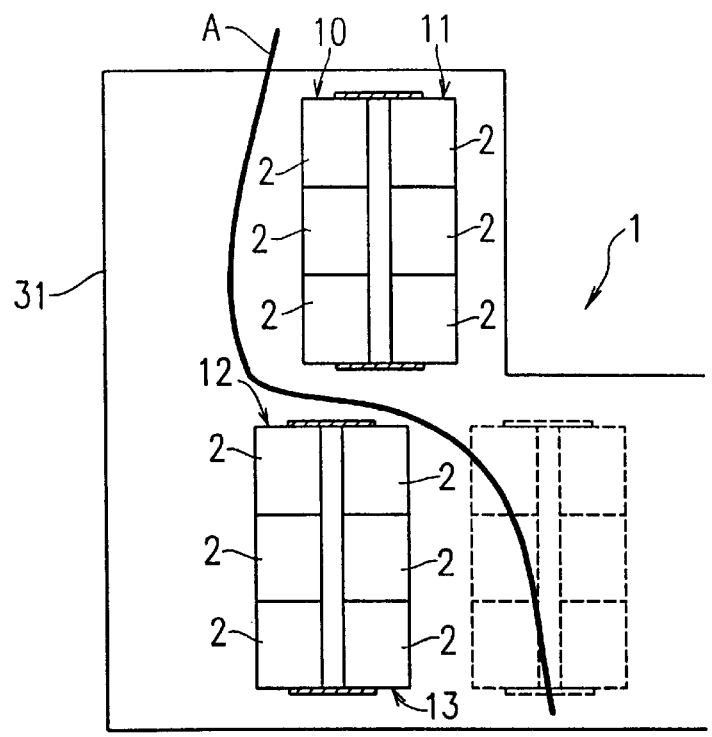
FIG. 3 schematically shows a structure of a substantial part of a battery pack according to Embodiment 3 of the present invention.

FIG. 3 schematically shows a structure of a substantial part of a battery pack 1 according to Embodiment 3 of the present invention. The battery pack 1 includes a pair of battery modules 10 and 11, each of the battery modules 10 and 11 including a plurality of battery cells 2 connected in series. The pair of battery modules 10 and 11 are connected to each other in parallel. The battery pack 1 further includes a pair of battery modules 12 and 13 connected to each other in parallel. The pair of battery modules 10 and 11 and the pair of battery modules 12 and 13 are contained in a case 31.

In the case 31, the pair of battery modules 10 and 11 are positioned in a region having a uniform cooling condition. Similarly, the other pair of battery modules 12 and 13 are positioned in a region having uniform cooling condition.

For example, when there is an isotherm A in the case 31 as shown in FIG. 3, the pair of battery modules 10 and 11 are positioned in the case 31 such that both are located in one of the regions divided by the isotherm A. The other pair of battery modules 12 and 13 also positioned in the case 31 such that both are located in another region divided by the isotherm A.

In FIG. 3, in the case 31, the pair of battery modules 10 and 11 and the other pair of battery modules 12 and 13 are positioned in different regions divided by the isotherm A. However, both pairs may be positioned in one of the regions divided by the isotherm A.

The pair of battery modules 10 and 11 and the other pair of battery modules 12 and 13 are positioned in the case 31 such that each pair is entirely in a region having a uniform cooling condition. No pair of battery modules is positioned across two or more regions having different cooling conditions, such as those shown in FIG. 3 with a broken line, for example.

For example, the isotherm A in the case 31 may be examined beforehand based on cooling conditions which depend on the shape of the case 31, etc.

Since each of the pair of battery modules 10 and 11 and the other pair of battery modules 12 and 13 is positioned in regions of the case 31 which have a uniform cooling condition as described above, the differences in temperature between the battery modules 10 and 11 and between the battery modules 12 and 13 can be decreased. Therefore, the variation in the amount of electric power charged in the battery cells 2 in the battery modules can be suppressed, and the state of charge of the battery cells 2 can become uniform.

The above-described structure in which a pair of battery modules connected to each other in parallel are positioned in a region of a case which has a uniform cooling condition is preferable for use as a battery pack in an electric vehicle which has a case of a complicated shape due to a limited space for containing a battery pack.

EMBODIMENT 4

Figure 4:
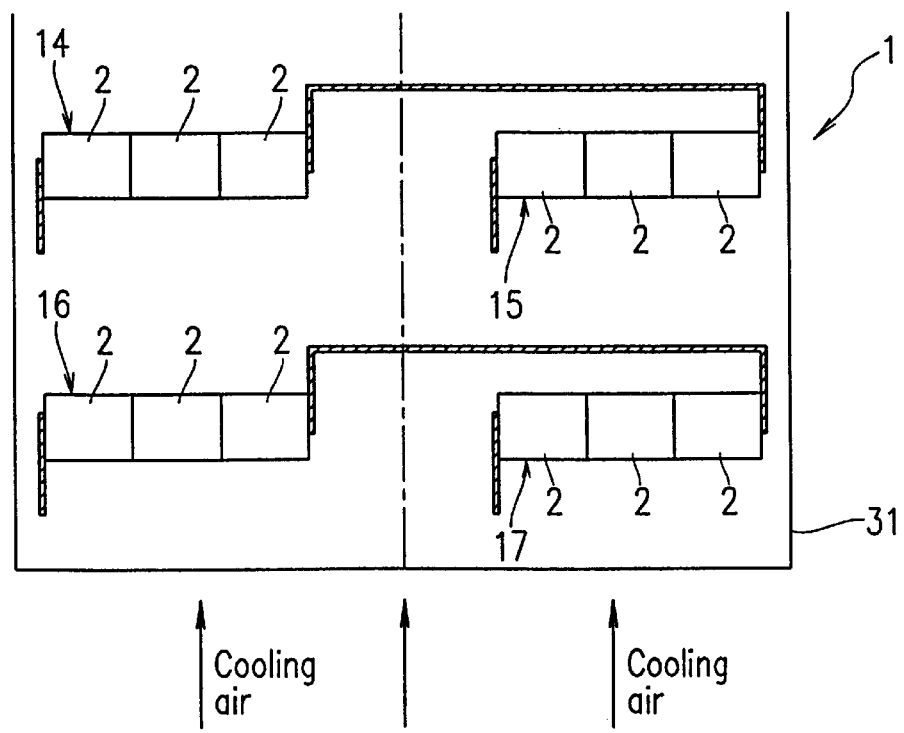
FIG. 4 schematically shows a structure of a substantial part of a battery pack according to Embodiment 4 of the present invention.
Figure 5:
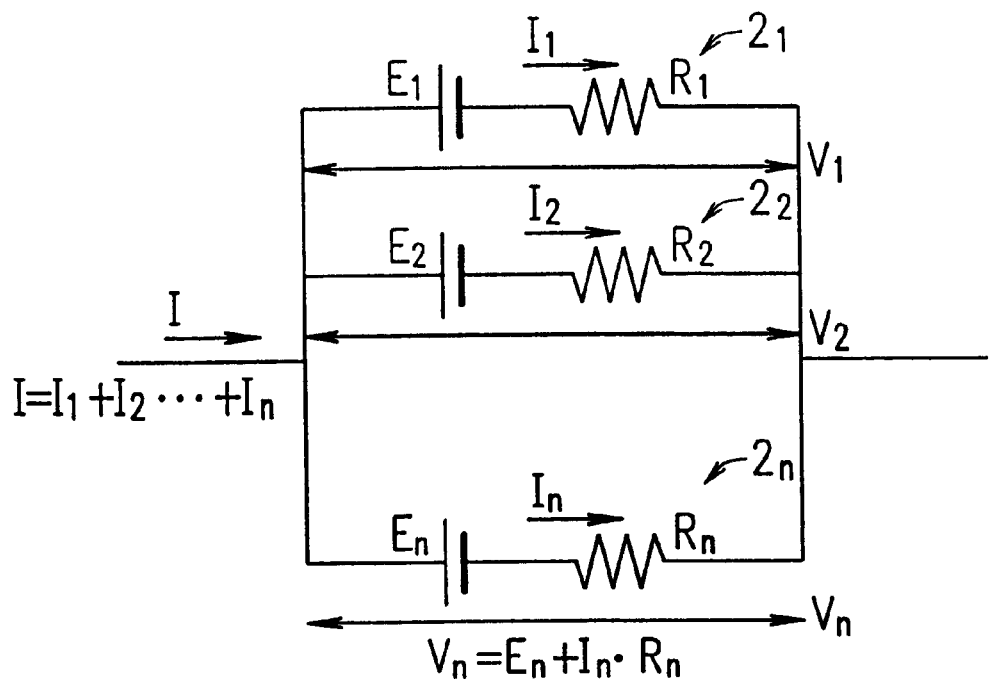
FIG. 5 shows an equivalent circuit of a plurality of battery modules connected in parallel.
Figure 6:
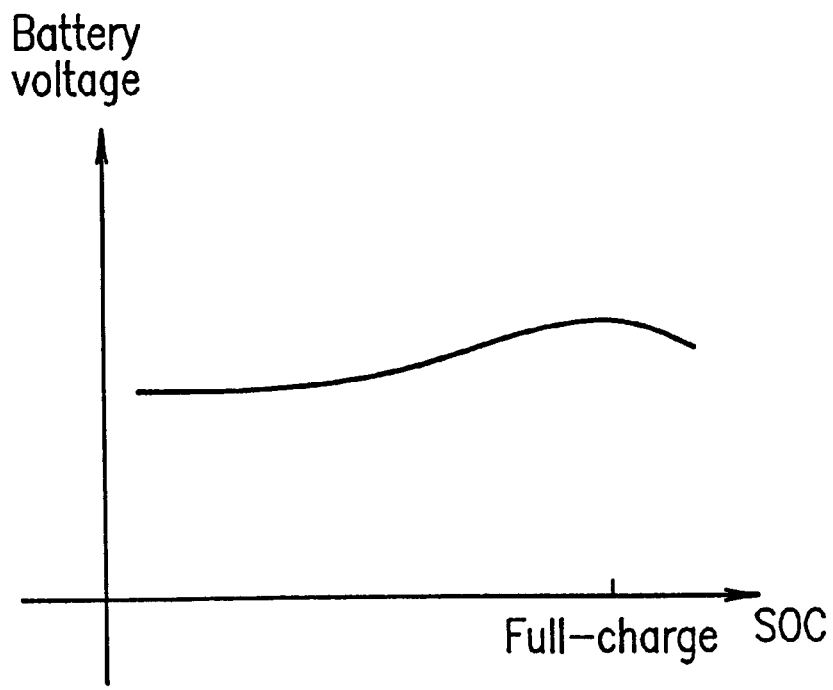
FIG. 6 is a graph showing a relationship between the voltage and the state of charge (SOC) of a battery during a charging operation.
Figure 7A:
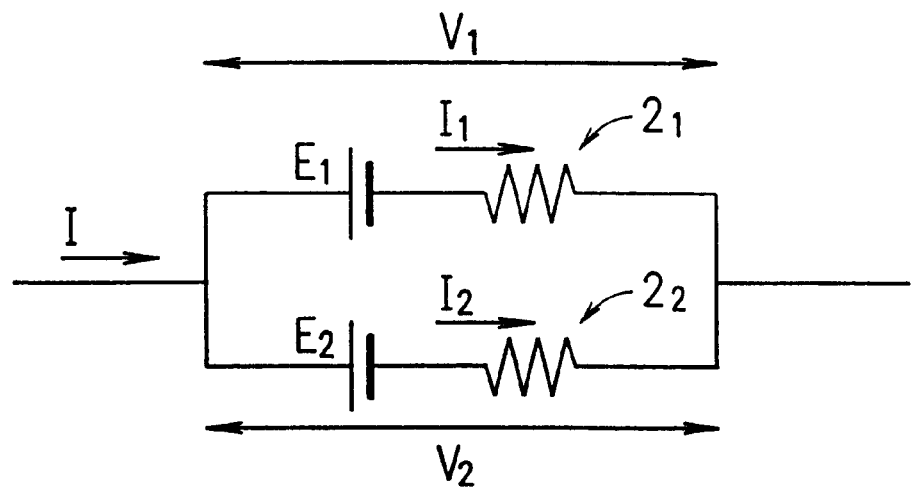
FIGS. 7A and 7B show equivalent circuits for explaining situations when one of a pair of battery modules connected in parallel is fully charged.
Figure 7B:
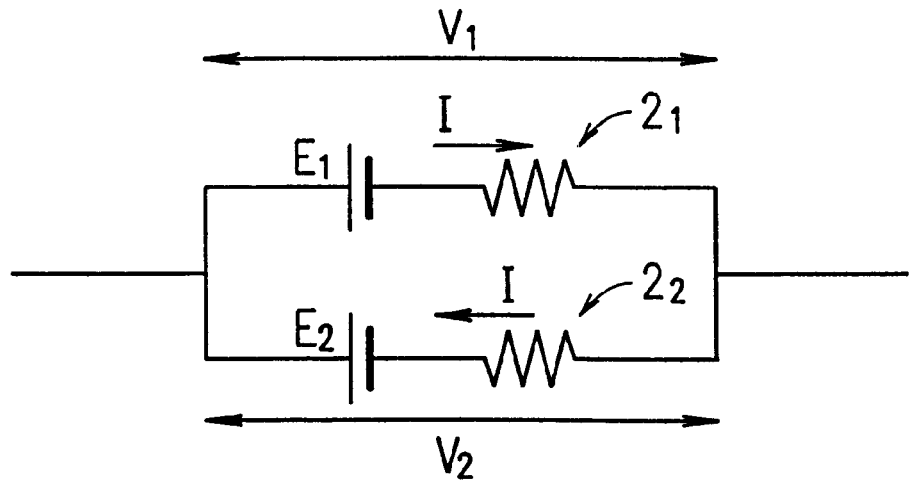

FIG. 4 schematically shows a structure of a substantial part of a battery pack 1 according to Embodiment 4 of the present invention. The battery pack 1 includes a plurality of battery modules 14–17, with each battery module including a plurality of battery cells 2 connected in series. The battery modules 14 and 15 are connected to each other in parallel as a pair. The battery modules 16 and 17 are also connected to each other in parallel as another pair. The battery modules 14–17 are contained in a case 31.

In the example illustrated in FIG. 4, if the case 31 is empty, i.e., if the case 31 does not contain a battery module, cooling air enters into the case 31 from one end thereof and flows linearly through every part of the case 31 in the direction indicated by arrows in FIG. 4. In the case 31, the battery modules 14 and 15 are positioned along a direction perpendicular to the direction in which the cooling air flows (i.e., along a width direction of the case 31) such that the distance from the end of the case 31 through which the cooling air enters to the battery module 14 is equal to the distance from the source of the cooling air to the battery module 15. The battery modules 14 and 15 are positioned symmetrically with respect to the center line which halves the case 31. The battery modules 16 and 17 are also positioned along the width direction of the case 31 such that the distance from the end of the case 31 through which the cooling air enters to the battery module 16 is equal to the distance from the source of the cooling air to the battery module 17. The battery modules 16 and 17 are positioned symmetrically with respect to the center line of the case 31.

When the cooling air linearly enters the case 31 in the direction shown in FIG. 4, the air flow distribution in the case 31 is symmetrical with respect to the center line of the case 31 along the direction perpendicular to the width direction (shown by a chain line). Accordingly, the cooling condition in the case 31 is distributed symmetrically with respect to the center line of the width direction. That is, in the case 31 having such a symmetrically-distributed cooling condition, the battery modules 14 and 15 are in the same cooling condition. Thus, the battery modules 14 and 15 can be cooled equally, and the difference in temperature between the battery modules 14 and 15 is decreased.

Similarly, inside the case 31 having the symmetrically-distributed cooling condition, the pair of the battery modules 16 and 17 are positioned such that the battery modules 16 and 17 are in the same cooling condition. Thus, the battery modules 16 and 17 can be cooled equally, and the difference in temperature between the battery modules 16 and 17 is decreased. Therefore, the variation in temperature of the battery cells 2 included in the battery modules 14–17 can be suppressed and the variation in the amount of electric power charged in the battery cells 2 is decreased. As a result, the state of charge of the battery cells 2 can become uniform.

As can been seen from the above description, a battery pack according to the present invention is structured such that the difference in temperature between the battery modules connected to each other in parallel can be decreased. With such a structure, overcharging of each battery cell included in the battery modules can be prevented. Accordingly, danger caused by overcharging can also be prevented. As a result, reliability of the battery pack is significantly improved, and the lifetime of the battery pack can be extended.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A battery pack comprising at least one pair of battery modules, each of the battery modules including a plurality of battery cells connected in series, wherein the at least one pair of the battery modules are connected in parallel and are positioned in close vicinity to each other such that radiant heat can be transferred between the pair battery modules.

2. A battery pack comprising at least one pair of battery modules, each of the battery modules including a plurality of battery cells connected in series, wherein the at least one pair of the battery modules are connected in parallel and are coupled to each other by a heat transfer member, and the heat transfer member bridges over the at least one pair of the battery modules.

3. A battery pack comprising at least one pair of battery modules, each of the battery modules including a plurality of battery cells connected in series, wherein the at least one pair of the battery modules are connected in parallel and are positioned in a region of a case which has a uniform cooling condition.

4. A battery pack according to claim 3, wherein the at least one pair of the battery modules are positioned in a region of a case which has a uniform cooling condition depending on the shape of the case.

* * * * *